July 4, 1967  A. D. ARGOUDELIS ET AL  3,329,568
ANTIBIOTIC LINCOMYCIN D AND A PROCESS
FOR PRODUCING THE SAME Filed May 28, 1964  2 Sheets-Sheet 1

A. D. ARGOUDELIS
D. J. MASON
INVENTOR.

BY

ATTORNEYS

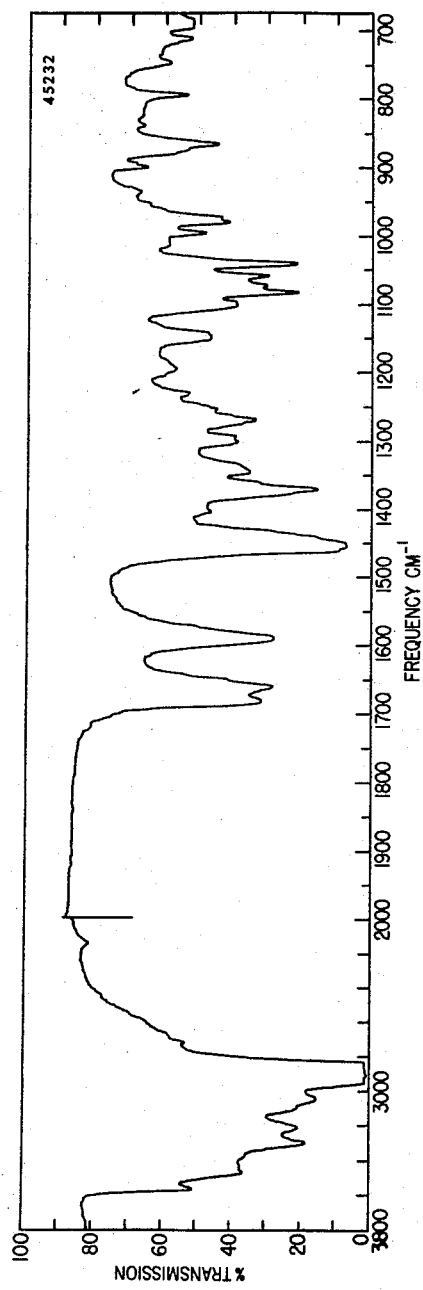

3,329,568
ANTIBIOTIC LINCOMYCIN D AND A PROCESS
FOR PRODUCING THE SAME
Alexander D. Argoudelis and Donald Joseph Mason,
Kalamazoo, Mich., assignors to The Upjohn Company,
Kalamazoo, Mich., a corporation of Delaware
Filed May 28, 1964, Ser. No. 371,047
15 Claims. (Cl. 167—65)

ABSTRACT OF THE DISCLOSURE

Antibiotic lincomycin D produced by a lincomycin-producing actinomycete when methyl thiolincosaminide is added to a lincomycin fermentation. Lincomycin D is active against Gram-positive bacteria and can be used to inhibit such microorganisms in various environments. Lincomycin D can be used in hospital laboratories to isolate *Klebsiella pneumoniae* from swabs in which mixed populations of gram-positive bacteria are present.

---

Figure 1:
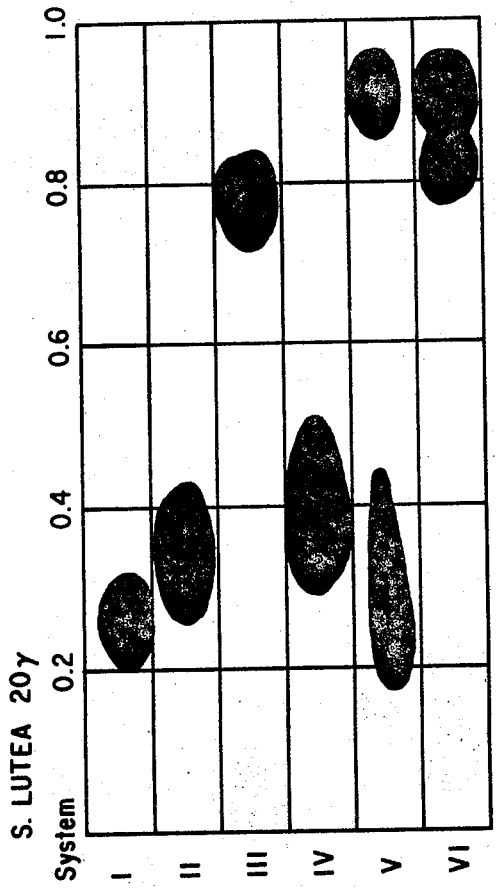

This invention relates to a novel composition of matter and to a process for the preparation thereof. More particularly this invention relates to a new compound, lincomycin D (U–11,973 E), and to a process for the production thereof.

Lincomycin D is a biosynthetic product produced by a lincomycin-producing actinomycete when methyl thiolincosaminide (MTL) is added to the fermentation described in Example 1 of U.S. Patent 3,086,912 for the production of lincolnensin, also called lincomycin. MTL is obtained by hydrazinolysis of lincomycin.

Lincomycin D is a basic compound and has the same antibacterial spectrum as lincomycin. Therefore, it can be used in the same manner as lincomycin. For example, it is useful in wash solutions, for sanitation purposes, as in the washing of hands and cleaning of equipment, floors or furnishings of contaminated rooms; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement, to promote the growth of mammals and birds, either alone or in combination with other antibiotics.

Lincomycin and lincomycin D are similar in some respects, such as both antibiotics have one basic titratable group with similar pKa values and very close equivalent weights; and both antibiotics do not show any absorption in the UV region. However, they are demonstrably different compounds as shown by their solubilities in various solvents, optical rotation, IR absorption spectra and thin-layer chromatography using a solvent system consisting of methyl ethyl ketone, acetone, water (150: 50:20, by volume).

The novel compound of the invention can be produced in a fermentation as described in Example 1, U.S. Patent 3,086,912 when an effective amount of methyl thiolincosaminide (MTL) ranging from more than incidental impurities of 0.75 gm./liter up to 8 gm./liter of fermentation medium is used. The MTL can be in the medium initially, or it can be fed to the culture during the fermentation. The feeding can be done continuously, semi-continuously or by other means as long as the concentration of MTL in the fermentation medium does not affect the growth of the microorganism to the point where the production of lincomycin D suffers. Preferably, the feeding is commenced when the fermentation is 24 to 48 hours old. The toxic level of MTL will vary with equipment and media used, but in general a level at any particular time during the fermentation less than about 3 gm./liter of fermentation medium is not toxic. Therefore, a feeding schedule for MTL can be used whereby the level of MTL in the fermentation is never greater than 3 gm./liter at any particular time. As this level is increased, and again depending on the equipment and media used, some toxicity manifestations, such as reduced mycelial growth, may be observed. When the mycelial growth is significantly depressed by the additions of MTL, then, ordinarily, a noticeable drop in the fermentation yield of lincomycin D will be observed. MTL is not considered to be an extremely toxic fermentation additive in the sense that, for example, phenylacetic acid is to the penicillin fermentation. Therefore, even if 8 gm./liter of MTL is fed into the fermentation at one time, licomycin D would still be produced in the fermentation.

The new compound of the invention is a nitrogenous base having the molecular formula $$C_{17}H_{32}N_2O_6S \cdot HCl \cdot H_2O$$

It is monobasic, has a pKa of about 7.6, and under ordinary conditions is more stable in the protonated, that is, salt form. It is soluble in water, lower-alkanols, e.g., methanol, ethanol, and the like; and relatively insoluble in lower-alkyl esters of lower alkanoic acids, e.g., ethyl acetate, butyl acetate, amyl acetate, and the like; lower-alkanones, e.g., acetone, methyl ethyl ketone, isopropyl butyl ketone, and the like; and chlorinated lower-alkanes, e.g., methylene chloride, chloroform, ethylene dichloride, and the like. It is insoluble in ether and benzene.

When methyl thiolincosaminide (MTL) is added to a lincomycin fermentation such as disclosed in U.S. Patent 3,086,912, lincomycin D and some lincomycin are produced. A preferred method for the recovery of lincomycin D is to utilize surface active adsorbents, for example, decolorizing carbon, or decolorizing resins, and eluting the adsorbed material with a solvent. Any of the solvents mentioned above can be used. A suitable decolorizing resin is Permutit DR (U.S. Patent 2,702,263). The whole beer is filtered as disclosed in U.S. Patent 3,086,912 before passage of the beer over the surface active adsorbent. The eluates are evaporated to dryness and the residue is extracted with a water-immiscible solvent from which the new compound and lincomycin are recovered. If desired, both antibiotics can be converted to the protonated form. Further procedures are necessary to effect a separation of lincomycin and lincomycin D. This can be done, conveniently, by repeated extractions at an alkaline pH of a solution containing the two antibiotics. A solvent for lincomycin, for example, a chlorinated lower-alkane, such as methylene chloride can be used. These solvent extracts contain predominantly lincomycin. The remaining aqueous solution, which contains predominantly lincomycin D with traces of lincomycin, advantageously, can be extracted repeatedly with a solvent for lincomycin D, for example, a water-immiscible lower alkanol, such as n-butyl alcohol. The solvent extracts can be subjected to further purification procedures, for example, counter current distribution, partition chromatography on silica or diatomaceous earth, advantageously, using solvents for lincomycin D, as disclosed above, and water mixtures as the eluting agents, adsorption chromatography on suitable adsorbents, for example, Florisil (a synthetic silicate of the type described in U.S. Patent 2,393,625 and sold by the Floridin Company), alumina and carbon with elution of the lincomycin D therefrom, advantageously, with solvents for lincomycin D, as mentioned above.

Fractional liquid-liquid extraction is accomplished in partition chromatographic columns or in a counter current distribution apparatus using solvent systems such as n-butyl alcohol and water (1:1).

Crystallization of lincomycin D can be accomplished, conveniently, by dissolving a purified salt preparation of lincomycin D in water and adding a lower alkanone, for example, acetone.

Recrystallization is accomplished by dissolving the crystalline salt in water, adding a water-miscible solvent, e.g., acetone, methanol, ethanol, or 2-propanol, and cooling to induce or complete crystallization. The crystals are filtered and washed with aqueous solvents, and, if desired, by anhydrous solvent and then vacuum dried.

The new compound of the invention can also be recovered from filtered fermentation beer by adsorption on cation exchange resins. Both the carboxylic and sulfonic acid types can be used. [Suitable carboxylic acid resins include the polyacrylic acid resins obtained by the copolymerization of acrylic acid and divinylbenzene by the procedure given on page 87 of Kunin, Ion Exchange Resins, 2nd Ed., (1958), John Wiley and Sons, Inc. Carboxylic acid cation exchange resins of this type are marketed under the tradenames Amberlite IRC–50 and Zeokarb 226. Suitable sulfonic acid resins include nuclear sulfonated polystyrene resins cross-linked with divinylbenzene which are obtained by the procedure given on page 84 of Kunin, supra. Sulfonated cation exchange resins of this type are marketed under the tradenames Dowex 50, Amberlite IR–120, Nalcite HCR, Chempro C–20, Permutit Q, and Zeokarb 225.]

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin. [Suitable anion exchange resins for this purpose are obtained by chloromethylating by the procedure given on pages 88 and 97 of Kunin, supra, polystyrene cross-linked, if desired, with divinylbenzene, prepared by the procedure given on page 84 of Kunin, supra, and quaternizing with trimethylamine or dimethylenethanolamine by the procedure given on page 97 of Kunin, supra. Anion exchange resins of this type are marketed under the tradenames Dowex 2, Dowex 20, Amberlite IRA–400, Duolite A–102, and Permutit S–1.]

The novel compound of the invention can be purified by successive transfers from protonated to non-protonated forms and vice versa, especially with other types of treatments intervening, as for example, solvent extractions and washings, chromatography and fractional liquid-liquid extractions. In this manner salts of lincomycin D can be employed to isolate or upgrade the antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of lincomycin D can be used for the same biological purposes as the free base or they can be employed to upgrade the antibiotic as previously described.

Specific acid salts can be made by neutralizing the free base with an appropriate acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4 - cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

Lincomycin D can be used in hospital laboratories to isolate *Klebsiella pneumoniae* from swabs or body exudates of patients in which mixed populations of certain other organisms, such as *Bacillus subtilis* and *Staphylococcus aureus* are present. The latter organisms are relatively susceptible to lincomycin D, whereas *K. pneumoniae* is relatively resistant, and when an appropriate concentration of lincomycin D is present in the medium *K. pneumoniae* will grow where *B. subtilis* or *S. aureus* will not. The new compound can also be used to inhibit gram-positive, spore-former spreaders on agar plates when isolating molds, yeasts, actinomycetes, and gram-negative organisms. It can be used, for example, in the isolation of microorganisms in soil samples as well as in the isolation of gram-negative organisms, for example, Pseudomonas, Proteus, and *Escherichia coli* from mixed infections in the presence of staphylococci or Streptococci.

The following examples are illustrative of the process and products of the present invention but are not to be construed as limiting. All percentages are by weight and all solvent mixture proportions are by volume unless otherwise noted.

EXAMPLE 1.—LINCOMYCIN D

A. *Fermentation*

A soil slant of *Streptomyces lincolnensis* var. *lincolnensis*, NRRL 2936, was used to inoculate a series of 500-ml. Erlenmeyer flasks each containing 100 ml. of sterile preseed medium consisting of the following ingredients:

| | |
|---|---|
| Yeastolac [1] | gm__ 10 |
| Glucose monohydrate | gm__ 10 |
| N–Z amine B [2] | gm__ 5 |
| Tap water q.s. | liter__ 1 |

[1] Yeastolac is a protein hydrolyzate of yeast cells.
[2] N–Z Amine B is Sheffield's enzymatic digest casein.

The preseed medium post sterilization pH was 7.3. The preseed was grown for 2 days at 28° C. on a Gump rotary shaker operating at 250 r.p.m. with a 2½ inch stroke.

Preseed inoculum (600 ml.), described above, was used to inoculate a 400-liter seed tank containing 250 liters of the following sterile seed medium:

| | |
|---|---|
| Glucose monohydrate | gm__ 10 |
| Yeast | gm__ 10 |
| Distillers solubles | gm__ 5 |
| Sodium chloride | gm__ 4 |
| Tap water q.s. | liter__ 1 |

Adjust pH to 7–7.2 with a 50% solution of sodium hydroxide, then add one gram/liter $CaCO_3$ and 2 ml./liter lard oil. Sterilize for 30 minutes at 121° C.

The seed inoculum was grown for 48 hours at a temperature of 28° C., aeration rate of 100 standard liters/min., and agitated at a rate of 280 r.p.m.

A 5% inoculum of the seed described above (12.5 liters) was used to inoculate a 400-liter fermentation tank containing 250 liters of the following sterile fermentation medium:

| | |
|---|---|
| Glucose monohydrate | gm__ 15 |
| Starch | gm__ 40 |
| Molasses | gm__ 20 |
| Wilson's peptone liquor No. 159 [1] | gm__ 10 |
| Corn steep liquor | gm__ 20 |
| Calcium carbonate | gm__ 8 |
| Lard oil | ml__ 5 |
| Ucon [2] | ml__ 2 |
| Tap water q.s. | liter__ 1 |

[1] Wilson's Peptone Liquor No. 159 is a preparation of enzymatically hydrolyzed proteins from animal origin.
[2] A synthetic polyalkylene glycol produced by Union Carbide Chemical Co., New York 17, N.Y.

Before sterilization, the pH was adjusted to 7.2 with a 50% solution of sodium hydroxide.

Two grams/liter of MTL was fed into the above fermentation at 48 hours. (In similar fermentations, levels of MTL as high as 8 grams/liter were fed to produce lincomycin D.)

The culture was grown for 90 hours at a temperature of 28° C., aeration rate of 200 standard liters per minute, and agitated at a rate of 280 r.p.m. The preharvest whole broth assay against *S. lutea* was 204 mcg./mg.

The assay against *Sarcina lutea* is conducted on agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism.

B. *Recovery*

Whole broth (35 liters) from a lincomycin D fermentation was filtered at harvest pH using 4% diatomaceous earth as filter aid. The filtrate was mixed for 30 min. with 5% activated carbon and then filtered using 5% diatomaceous earth as a filter aid. The carbon cake was washed successively with water and 20% aqueous acetone, then eluted once with 70% aqueous acetone, and twice with 90% aqueous acetone. The three acetone eluates (one 70% and two 90%) were combined, concentrated to an aqueous and freeze-dried to give 121.7 g. of preparation No. 1 which contained lincomycin and lincomycin D. The carbon cake remaining after the acetone extractions was slurried with n-butanol, acetone, and water (3:3:2) and filtered. The mother liquor was concentrated to an aqueous solution and freeze-dried to give 9 grams of preparation No. 2 which contained lincomycin and lincomycin D. Parts of preparations 1 and 2, 112 and 6 grams, respectively, were combined and dissolved in 400 ml. of water. The pH of the solution was adjusted to 10 by the addition of 11 ml. of 5 N aqueous sodium hydroxide. This solution was then extracted with 500 ml. of Skellysolve B (isomeric hexanes), and the extract discarded. The remaining aqueous solution (425 ml.) was then extracted 4 times with 250 ml. portions of methylene chloride. The pooled methylene chloride extracts (950 ml.) were concentrated to dryness to yield 4.5 gm. of preparation A which contained only lincomycin. The spent aqueous solution was extracted five times with 250 ml. portions of n-butyl alcohol. The combined butanol extract was washed with water and then concentrated to an aqueous solution and freeze-dried. This preparation was then dissolved in a solution containing 20 ml. of absolute methanol and 29 ml. of 1 N methanolic hydrogen chloride. This solution was mixed with 500 ml. of ethyl ether and the precipitate which formed was isolated by filtration and dissolved in water. The aqueous solution was freeze-dried to a residue, preparation B, which contained lincomycin and lincomycin D.

C. *Counter current distribution*

Preparation B was dissolved in 100 ml. of the lower phase of a solvent consisting of equal volumes of n-butyl alcohol and water. The solution was mixed with an equal volume of the upper phase of the above-mentioned system, and transferred to an all-glass, Craig counter current distribution (10 ml. per phase) apparatus. After 930 transfers the distribution was analyzed by solids determination and thin-layer chromatography. Analysis by thin-layer chromatography showed that tubes 104–170 contained predominantly lincomycin D. These tubes were pooled and concentrated in vacuo (approximately 80 ml.), at which time crystalline lincomycin D hydrochloride (200 mg.) precipitated. The filtrate was concentrated further to a volume of 50 ml. and additional crystalline lincomycin D hydrochloride which precipitated was isolated by filtration; yield 200 mg. These two crude crystalline preparations were combined (400 mg.) and dissolved in 17 ml. of water. On the addition of 60 ml. of acetone to this solution, high purity crystalline lincomycin D hydrochloride in the form of colorless long feather crystals precipitated. The crystals were isolated by filtration and dried; yield 170 mg.

The methyl thiolincosaminide used in Example 1 was prepared as follows:

A solution of 4 g. of lincomycin in 20 ml. of hydrazine hydrate (98–100%) was refluxed for 21 hours. The excess hydrazine hydrate was distilled off in vacuo under nitrogen, while heating on the steam bath, to leave a pasty mass of crystals. The mass was cooled, acetonitrile was added, and the mixture was stirred until the paste was dispersed and the crystals suspended. The crystals were collected, washed with acetonitrile and with ether. The yield of white, crystalline methyl thiolincosaminide after drying in vacuo at room temperature was 2.1 g. (84%). Recrystallization was accomplished by dissolving the substance in hot dimethylformamide and adding an equal volume of ethylene glycol dimethyl ether.

*Characterization of lincomycin D hydrochloride*

*U.V. Absorption spectrum.*—Lincomycin D hydrochloride does not show any absorption maxima in the range of 220–400 m$\mu$.

*Titration.*—Potentiometric titration shows the presence of one basic titratable group with a pKa of 7.6.

*Solubility.*—Lincomycin D hydrochloride is soluble in water, lower-alkanols, e.g., methanol, ethanol, and the like. It is relatively insoluble in lower-alkanones, e.g., acetone, methyl ethyl ketone, isopropyl n-butyl ketone, and the like; lower-alkyl esters of lower-alkanoic acids, e.g., ethyl acetate, n-butyl acetate, amyl acetate, and the like; chlorinated lower-alkanes, e.g., methylene chloride, chloroform, ethylene dichloride and the like; ether, and benzene.

*Molecular weight.*—Found 450±20 (by potentiometric titration).

*Papergram.*—The paper chromatographic pattern of lincomycin D hydrochloride in the following solvent systems is as shown in FIGURE I of the drawing:

(I) 1-butanol, water (84:16), 16 hours.
(II) 1-butanol, water (84:16) plus 0.25% p-toluene-sulfonic acid, 16 hours.
(III) 1-butanol, acetic acid, water (2:1:1), 16 hours.
(IV) 2% piperidine (v./v.) in n-butanol, water (84:16), 16 hours.
(V) 1-butanol, water (4:96), 5 hours.
(VI) 1-butanol, water (4:96) plus 0.25% p-toluene sulfonic acid, 5 hours.

*Crystal appearance.*—White needles.
*Specific rotation.*—$[\alpha]_D^{25} = +149°$ (c., 0.923, water).
*Elemental analysis.*—Calcd. for $C_{17}H_{32}N_2O_6S \cdot HCl \cdot H_2O$: C, 45.73; H, 7.90; N, 6.28; S, 7.18; Cl, 7.94; O, 25.08. Found: C, 45.62; H, 7.78; N, 6.23; S, 7.31; Cl, 7.82; O, 25.24 (by diff.).

*Infrared absorption spectrum.*—The infrared absorption spectrum of lincomycin D hydrochloride in mineral oil mull, as shown in FIGURE II of the drawing, in reciprocal centimeters is as follows: 3570 (W); 3478 (W); 3305 (W); 3220 (W); 3050 (W); 1687 (S); 1668 (S); 1596 (S); 1350 (W); 1308 (W); 1277 (W); 1240 (W); 1201 (W); 1155 (M–W); 1108 (M); 1090 (M–W); 1067 (W); 1050 (M); 1005 (W); 990 (M–W); 980 (M–W); 875 (M); 804 (M–W); 755 (W); 720 (W); 700 (W).

Band intensities in the above IR spectrum are indicated as S, M, W, respectively, and are approximated in terms of the backgrounds in the vicinity of the bands. An S band is of the same order of intensity as the strongest band in the spectrum; M bands are between ⅓ and ⅔ as intense as the strongest band, and W bands are less than ⅓ as intense as the strongest band.

We claim:
1. A member of the group consisting of lincomycin D and the acid addition salts thereof, said lincomycin D being free base form of lincomycin D hydrochloride, a compound which
(a) is effective in inhibiting the growth of various gram-positive bacteria;
(b) is soluble in water and lower-alkanols, e.g., methanol, ethanol, and the like; and relatively insoluble in lower-alkanones, e.g., acetone, methyl ethyl ketone, isopropyl n-butyl ketone, and the like; lower-alkyl esters of lower-alkanoic acids, e.g., ethyl acetate, n-butyl acetate, amyl acetate, and the like; chlorinated lower-alkanes, e.g., methylene chloride, chloroform, ethylene dichloride, and the like; ether, and benzene; and which in its essentially pure crystalline form has
(c) the following elemental analysis: C, 45.62; H, 7.78; N, 6.23; S, 7.31; Cl, 7.82; O, 25.24 (by diff.);
(d) an optical rotation $[\alpha]_D^{25} + 149°$ (c., 0.923, water);
(e) a molecular weight of 450±20 as determined by potentiometric titration, and
(f) a characteristic infrared absorption spectrum as shown in FIGURE II of the accompanying drawing.

2. The hydrochloride of lincomycin D as defined in claim 1.

3. An acid addition salt of lincomycin D as defined in claim 1.

4. A compound according to claim 3 in its essentially pure crystalline form.

5. The hydrochloride according to claim 3 in its essentially pure crystalline form.

6. A process which comprises cultivating *Streptomyces lincolnensis* var. *lincolnensis* in an aqueous nutrient medium containing methyl thiolincosaminide in an effective amount ranging from more than incidental impurities up to 8 gm./liter of aqueous nutrient medium, under aerobic conditions until substantial antibacterial activity is imparted to said medium by production of lincomycin D.

7. A process according to claim 6 which comprises isolating the lincomycin D so produced.

8. A process according to claim 6 wherein the aqueous nutrient medium contains methyl thiolincosaminide in an effective amount ranging from more than incidental impurities of 0.25 gm./liter up to 8 gm./liter of aqueous nutrient medium.

9. A process according to claim 6 in which the cultivation is effected at a temperature of about 18° C. to about 37° C. for a period between about 2 to 10 days.

10. A process which comprises cultivating *Streptomyces lincolnensis* var. *lincolnensis* in an aqueous nutrient medium containing methyl thiolincosaminide, in an effective amount ranging from more than incidental impurities of 0.25 gm./liter up to 8 gm./liter of aqueous nutrient medium, a source of assimilable carbohydrate and assimilable nitrogen under aerobic conditions until substantial antibacterial activity is imparted to said medium by the production of lincomycin D.

11. A process according to claim 10 which comprises isolating the lincomycin D so produced.

12. A process which comprises cultivating *Streptomyces lincolnensis* var. *lincolnensis* in an aqueous nutrient medium to which 2 gm./liter of methyl thiolincosaminide is fed, under aerobic conditions until substantial, antibacterial activity is imparted to said medium by production of lincomycin D.

13. A process which comprises cultivating *Streptomyces lincolnensis* var. *lincolnensis* in an aqueous nutrient medium to which 2 gm./liter of methyl thiolincosaminide is fed, a source of assimilable carbohydrate and assimilable nitrogen under aerobic conditions until substantial antibacterial activity is imparted to said medium by the production of lincomycin D.

14. A process according to claim 12 which comprises isolating lincomycin D so produced.

15. A process according to claim 13 which comprises isolating the lincomycin D so produced.

References Cited
UNITED STATES PATENTS
3,027,300   3/1962   Bergy et al. _____ 167—65

ALBERT T. MEYERS, *Primary Examiner.*

D. STEPHENS, *Assistant Examiner.*